Dec. 17, 1935. M. BÄUML 2,024,793
AUTOMATIC REGISTERING DEVICE FOR MEASURING INSTRUMENTS AND APPLIANCES
Filed May 7, 1931 2 Sheets-Sheet 2
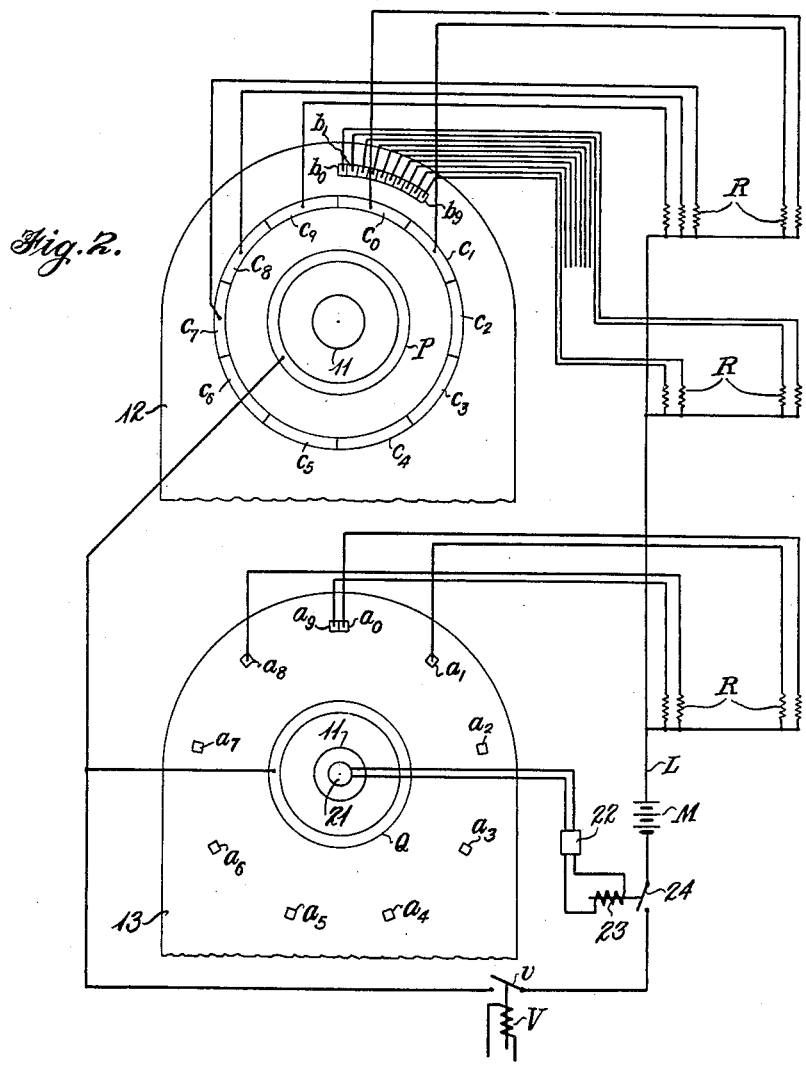
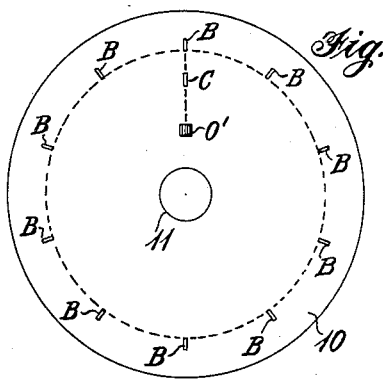
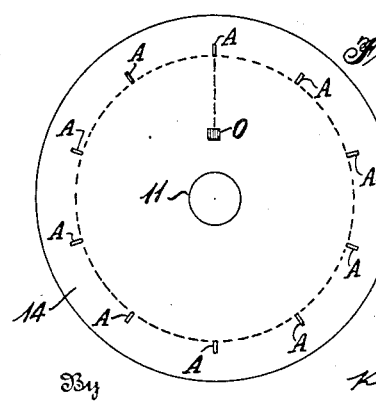
Inventor
Maximilian Bäuml
By Knight Bros
His Attorneys Patented Dec. 17, 1935

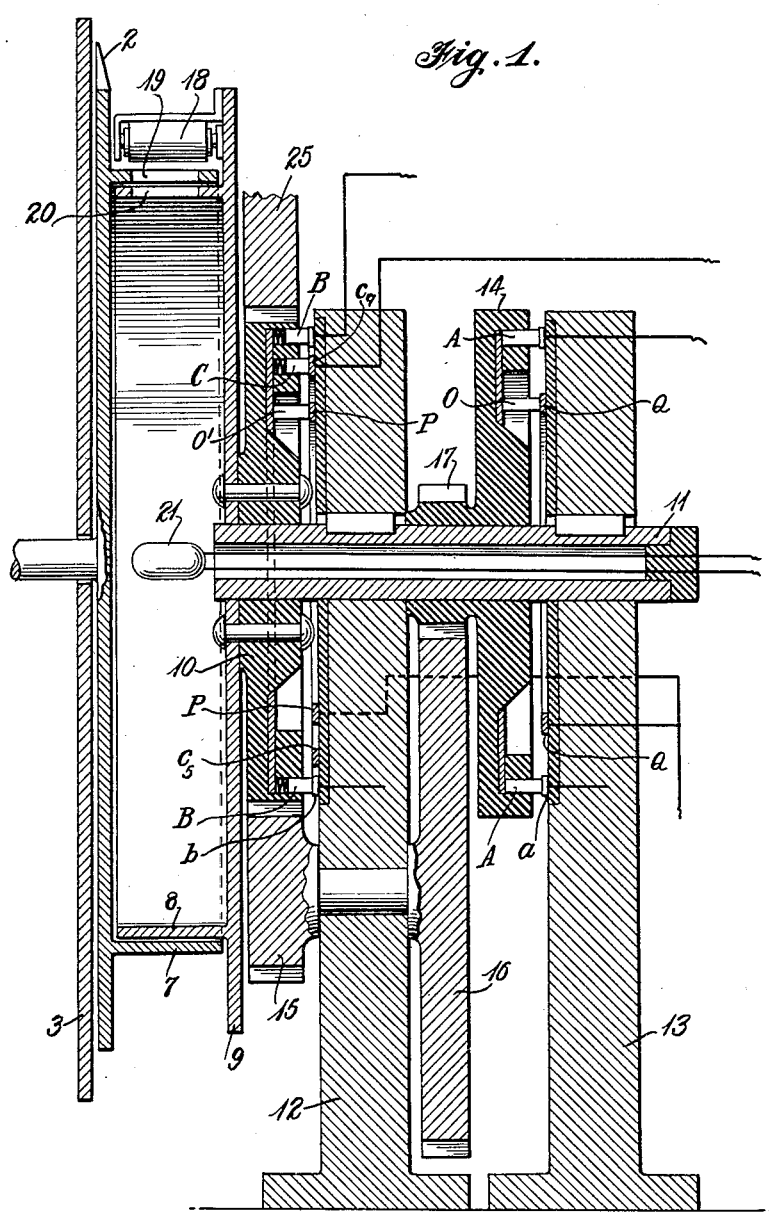

2,024,793

UNITED STATES PATENT OFFICE 2,024,793

AUTOMATIC REGISTERING DEVICE FOR MEASURING INSTRUMENTS AND APPLIANCES

Maximilian Bäuml, Vienna, Austria, assignor, by mesne assignments, of one-half to "Norma" Instrumenten Fabrik Bonwitt und Co., Vienna, Austria, a firm consisting of Wilhelm Bonwitt, Paul Holitscher, Robert Kühnel, and Josef Schalkhammer Application May 7, 1931, Serial No. 535,746
In Austria May 12, 1930

18 Claims. (Cl. 177—351)

This invention relates to a recorder or register operating device for use in connection with measuring instruments and appliances. For the registration of the reading of measuring appliances in which a pointer is caused to be moved at each measuring operation from a position of rest, in particular of dial scales and weighing machines, devices are already known in which relays actuate the type wheels or other recording or registering means, these relays being arranged to respond to the establishment of contact between the contacts of a transmitter moved or otherwise operated by the measuring appliance and the contacts of a receiver connected to the relays. These known devices are equipped with a receiver having as many contacts as there are graduation marks on the dial of the measuring appliance, e. g. in a dial scale with 1000 graduation marks, 1000 contacts, each of which is connected to a relay. The transmitter of these devices, on the other hand, is provided with only one contact for each numerical place. On account of the great number of contacts required, of the still greater number of connections, and of the necessarily small dimensions of the contacts used, these devices are complicated and not particularly reliable, and are subject to the further drawback that when the pointer comes to rest between two graduation marks, the transmitter must be bent to form contact with one or other of the adjacent contacts. In the known devices these drawbacks have been obviated by the arrangement of the receiving members in groups for each of the numerical places, and by the association with these members of more than one transmitting member, whereby a very great reduction in the number of the receiving members is effected.

But by these means the exactness of the measurements was impaired, for by increasing the transmitter contacts the weight of the parts to be moved by the measuring apparatus and the friction resistances were increased. In other well known devices the attempt was made to avoid these disadvantages by providing for the adjustment of the registering means to the value measured, not by the measuring apparatus itself, but by a separate source of power. For this purpose the measuring apparatus was clamped after having assumed a position corresponding to the value measured and an arm moved to a certain position by the measuring apparatus was used as a stop for an auxiliary pointer connected to the registering means through a mechanical or an electrical transmission. In these devices the auxiliary pointer was moved by a separate source of power after the measuring apparatus had been clamped, until it touched the said arm. The registering means was adjusted in accordance with the position of the auxiliary pointer by means of the mechanical or electrical transmission. But these devices had the drawback that there occurred undesired reactions upon the measuring apparatus, due to the clamping of the measuring apparatus and to the contact of the auxiliary pointer with the measuring apparatus, which reactions caused uncertain measurements and rapid wear.

These drawbacks are avoided by the present invention through the use of an auxiliary member moved independently from the measuring apparatus by a separate source of power to a position coordinated to the measuring position of the measuring apparatus, without the necessity of first clamping the measuring apparatus and without the occurrence of a contact between the auxiliary setting member of any part of the registering devices and the measuring apparatus. Thus the weight and the friction resistance of the mechanical or electrical transmission means between the auxiliary setting member and the registering means have no influence upon the exactness of the measurements.

In order to ensure that the recording operation is performed only after the pointer of the measuring appliance has assumed its definitive position, and thus to preclude false registration, there can be interposed in the current circuit of the registering device a time relay which closes the current circuit for the registering device only after the lapse of a certain length of time sufficient for the definitive indication of the measuring appliance.

For the purpose of enabling the transmitted impulses received by the groups of receiving members to be utilized for the actuation of the recording device, the relays can be connected in sequence, so that the traversing of a certain number of these relays by the current causes the recording device to be correspondingly set or adjusted.

A form of execution of the invention having partly mechanical and partly electrical transmission between the auxiliary pointer and the registering means will now be described in detail, as applied to a dial weighing scale graduated according to the decimal system and equipped with a registering or recording device, reference being had, for the readier understanding of this description, to the accompanying drawings, in which the principles and functioning of the invention are illustrated.

In the drawings

Fig. 1 is a vertical sectional view of a device in accordance with my invention;

Fig. 2 is a diagrammatic front elevation of the stationary contact plates, also including a wiring diagram;

Fig. 3 is a diagrammatic front elevation of one of the rotary contact plates; and Fig. 4 is a diagrammatic front elevation of another rotary contact plate.

In this form of the invention the register operating means are represented as a series of relays R arranged in three groups, the lowermost being the units group, the intermediate group the tens, and the uppermost group the hundreds. These relays are connected in parallel circuits to a common lead L running to a source of current M. The common part of the circuit contains a master switch 24 controlled by a relay 23, and a time delay switch $v$ controlled by a relay V. From switch $v$ the common part of the circuit leads to bus bars Q and P making contact with brushes O and O' respectively. The parallel circuits of the relays R are selectively connected to these bus bars by transmitting contacts A, B, C and receiving contacts $a$, $b$, $c$, the arrangement and operation of which will be presently described. The general plan of this machine is to have the selecting means successively connect the relay circuits and to have the master switch 24 complete the circuit through whatever relay is connected when the selecting means assumes a position corresponding to the indication of the measuring apparatus. The time delay switch V, $v$ delays the completion of the circuit until the measuring apparatus has reached a definitive position.

The pointer 2 of the measuring appliance carries a ring or drum 7, which is concentric to its axle, and in which a ring or drum 8 fixed to a disc 9 fits with a slight clearance. The disc 9 is carried by a toothed wheel 10 which is freely rotatable on a fixed hollow shaft 11. The shaft 11 rests in bearings 12, 13 which carry the rows of receiver contacts $a$, $b$, $c$ adapted to cooperate with the transmitter contacts A, B, C. The contacts C, B are on the toothed wheel 10, and the contacts A on a disc 14 which runs idly on the shaft 11, and which is driven from the toothed wheel 10 by means of gear wheels 15, 16, and 17 at a ten times greater speed. The disc 9 is provided with a lighting bulb 18. The drums 7 and 8 are provided with slits 19 and 20 which can be caused to register or coincide. The slit 19 registers with the pointer of the measuring appliance, while the slit 20 is disposed opposite the zero point of the rows of contacts A, B, C. On the axis of the pointer of the measuring appliance there is provided, within the drums 7 and 8 a photoelectric cell 21, which is carried by the hollow shaft 11. The current conducting wires to the cell are taken through the hollow shaft 11. In the current circuit of this cell there is an amplifier 22, and also the relay 23 previously mentioned which is adapted to actuate switch 24 in the common part of the circuits of the three sets of relays R serving to actuate the recording or registering device. The lamp 18 is adapted to be switched on and off by means of a switch connected therewith through sliding contacts (not shown).

The described selecting device, which is mounted on the hollow shaft 11, is constantly driven by the driving wheel 25. When the pointer of the measuring appliance has come to rest in the indicating position, the lamp 18 is switched on by hand. At the moment when the optical device comprising the lamp 18, the slitted drums 7 and 8, and the photoelectric cell 21 senses the position of the pointer 2, that is, when the slits 19 and 20 coincide, the photoelectric cell 21 receives an impulse, whereby, through the amplifier 22 and relay 23, the common part of the circuits of the relays R is closed by means of the switch 24. As a result, those of the contacts A, B, C, and $a$, $b$, $c$ which are in contact with each other at the moment of the coincidence of the slit 19 and 20 act upon three of the relays R with current impulses, and thus set the recording device 15 in any well known manner to the figures representing the measured value. Instead of waiting until the pointer of the measuring appliance has come to rest before turning on the lamp this lamp may be turned on immediately and a time delay switch V, $v$ provided in the circuit to prevent it from being completed before the pointer has come to rest.

It will be observed that in a machine of the kind described the transmitter members of the selecting mechanism are not moved by the measuring mechanism, but independently of the latter by a separate power shaft. Also, the group of transmitting members for the lowest numerical order is equipped with a multiplying gear transmission, so that the angular path of these transmission members amounts to many times, for example ten times, the indicating movement of the pointer of the measuring mechanism. With a measuring range of 1,000 units and ten transmission members for the units, ten receiver members are sufficient for the units order. The ten receiver contacts $a$, which are distributed over the entire circumference of a circle, can be made ten times as wide as would be possible without the multiplying gear transmission. The impulse transmission is in this manner rendered more reliable than in the forms of construction heretofore commonly employed, with a large number of small receiving members. The pitch of the contacts $a$ amounts to .11 of the circumference of the circle on which they are arranged, only the first and the last contact having a pitch of .01. The ten transmitter contacts A are all connected together and are also connected to the brush O.

For the tens there are provided ten transmitter contacts B and, for the hundreds, one transmitter contact C. On the same radius as the contacts B are ten receiver contacts $b$. Each of the receiver contacts $b$ is .01 of the circumference of the circle on which they are arranged, and the entire group of ten is confined to .1 of this circle. On the same radius as the transmitter contact C are ten receiver contacts $c$. Each of these contacts $c$ occupies .1 of the circumference of the circle on which they are arranged. Thus, in the hundreds order the contact C makes a continuous contact with each receiver segment $c$, while one of the contacts B is traversing the entire group of contacts $b$, and while in the units order the transmitter contacts A are operating in succession and touching the contacts $a$ in succession until each contact A has touched each contact $a$ before the contact C shifts to the next segment $c$.

I claim:—

1. In combination with a measuring apparatus comprising parts relatively movable in accordance with the measurements; means for sensing the relative position of said parts without physical contact therewith, comprising ray transmitting and receiving means, and means for modifying the influence of the rays upon said receiving means, including an element having a movement independent of said parts; registering means comprising means connected with said element so as to have definite positions corresponding to the positions of said element; and means controlled by said ray receiving means for determining the definitive position of said registering means when said sensing means senses the relative position of said parts.

2. In a measuring apparatus comprising a stationary part and a part movable with respect thereto in accordance with the measurements; means for sensing the relative position of said parts comprising an element movable with the movable part of said measuring apparatus and a second element movable independently from said movable part along a path coordinated with that of the said first element, registering means comprising means positively connected with said second element and movable therewith so as to have definite positions each corresponding to a position of said second element; and a master control device under the joint control of said two elements adapted to set said registering means in its definitive position when said elements assume a certain relative position.

3. In a measuring apparatus comprising a stationary part and a part movable with respect thereto in accordance with the measurements; means for sensing the relative position of said parts comprising an element movable with the movable part of said measuring apparatus and a second element movable independently from said movable part along a path coordinated with that of the said first element; registering means comprising means positively connected with said second element and movable therewith so as to have definite positions each corresponding to a position of said second element; and optically controlled means under the joint control of said two elements adapted to release an operation of said registering means when said elements assume a certain relative position.

4. In a measuring apparatus comprising a stationary part and a part movable with respect thereto in accordance with the measurements; means for registering the relative position of said parts comprising an element movable with the movable part of said measuring apparatus and a second element movable independently from said movable part along a path coordinated with that of the said first element; power operated driving means for moving said second element along said path; registering means comprising means positively connected with said second element and movable therewith so as to have definite positions each corresponding to a position of said second element; and a master control device under the joint control of said two elements adapted to operate said registering means when said elements assume a certain relative position.

5. In combination with a measuring apparatus comprising a member movable in accordance with the measurements; means for sensing the position of said member comprising an element movable independently of said member so as to be capable of being brought to the same position relative to said member in all positions of the latter, and a ray transmitting and receiving system having a part movable with said member and a part movable with said element, the receiving means of said system being influenced differently when said member and said element assume said same relative position; and number exhibiting means comprising means connected with said element so as to have definite positions corresponding to the positions of said element, the definitive position of said last-mentioned means being determined by the response of said receiving means when said member and said element assume said same relative position.

6. In a measuring apparatus comprising a stationary part and a part movable with respect thereto in accordance with the measurements; means for registering the relative position of said parts, comprising register operating devices corresponding to the graduation of said measuring apparatus and movable independently from the said movable part; control means comprising an element movable with the movable part of said measuring apparatus, and a second element movable independently from said movable part along a path coordinated with that of said first element; said register operating devices being controlled by said second element; and a master control device for said register operating devices, said elements having means associated therewith for rendering said master control device operative only when said elements assume a certain relative position.

7. In a measuring apparatus comprising a stationary part and a part movable with respect thereto in accordance with the measurements; means for registering the relative position of said parts, comprising register operating devices corresponding to the graduations of said measuring apparatus and movable independently from the said movable part; control means comprising an element movable with the movable part of said measuring apparatus, and a second element movable independently from said movable part along a path coordinated with that of said first element; selecting means for said register operating devices controlled by said second element; and a master control device for said register operating devices, said elements having means associated therewith for rendering said master control device operative only when said elements assume a certain relative position.

8. Apparatus as described in claim 7, wherein said master control device comprises a light-sensitive cell, means for illuminating said cell, and light control devices operated by the elements of said control means and adapted to change the influence of said illuminating means on said cell when said elements assume a certain relative position.

9. In a measuring apparatus comprising a stationary part and a part movable with respect thereto in accordance with the measurements; means for registering the relative position of said parts, comprising an electrical circuit composed of a common part and a plurality of branches; a register operating relay in each of said branches; selecting means for selectively connecting said branches to the common part of said circuit; a source of current and a master switch in the common part of said circuit; control means comprising an element movable with the movable part of said measuring apparatus and a second element connected with said selecting means and movable independently of said first element along a path coordinated with that of said first element; and means associated with said elements for closing said master switch when said elements assume a particular relative position.

10. In a measuring apparatus comprising a stationary part and a part movable with respect thereto in accordance with the measurements; means for registering the relative position of said parts, comprising register operating devices corresponding to the graduations of said measuring apparatus and movable independently from said movable part; a light-sensitive cell; means for illuminating said cell; a screen movable with the movable part of said measuring apparatus and adapted to intercept the light passing from said illuminating means to said cell; a second screen adapted to intercept the light passing from said illuminating means to said cell and movable independently of said first screen along a path coordinated with that of said first screen, said screens having transparent apertures adapted to come into registration when said screens assume a certain relative position, to transmit the light to said cell; selecting means for said register operating devices movable with said second screen; and a master control device for said register operating devices controlled by said light sensitive cell.

11. In a measuring apparatus comprising a stationary part and a part movable with respect thereto in accordance with the measurements; means for registering the relative position of said parts, comprising register operating devices corresponding to the graduations of said measuring apparatus and movable independently from said movable part; a pair of relatively rotatable nested drums; a light-sensitive cell enclosed within said drums; illuminating means for said cell outside of said drums, said drums having transparent apertures adapted to admit light from said illuminating means to said cell when the drums assume a certain relative position, one of said drums being movable with the movable part of said measuring apparatus; selecting means for said register operating devices controlled by the other of said drums; and a master control device for said register operating devices controlled by said light-sensitive cell.

12. In a measuring apparatus comprising a stationary part and a part movable with respect thereto in accordance with the measurements; means for registering the relative position of said parts, comprising register operating devices corresponding to the graduations of said measuring apparatus and movable independently from said movable part; a pair of relatively rotatable nested drums; a light-sensitive cell enclosed by said drums; a source of light outside of said drums and rigidly connected to one of them, the drum to which the source of light is connected having a transparent aperture in its periphery on a line between said source of light and said light-sensitive cell, the other of said drums having a transparent aperture adapted to register with said first mentioned aperture when said drums are in a certain relative position; selecting means for said register operating devices controlled by said second mentioned drum; and a master control device for said register operating devices controlled by said light-sensitive cell.

13. In a measuring apparatus comprising a stationary part and a part movable with respect thereto in accordance with the measurements; means for registering the relative position of said parts, comprising register operating devices corresponding to the graduations of said measuring apparatus and movable independently from said movable part; control means comprising an element movable with the movable part of said measuring apparatus, and a second element movable independently from said movable part along a path coordinated with that of said first element; means for imparting a continuous motion to said second element; selecting means for said register operating devices controlled by said second element; and a master control device for said register operating devices, said elements having means associated therewith for rendering said master control device operative only when said elements assume a certain relative position.

14. In a measuring apparatus comprising a stationary part and a part movable with respect thereto in accordance with the measurements; means for registering the relative position of said parts, comprising register operating devices corresponding to the graduations of said measuring apparatus and movable independently from said movable part; and means for selectively operating said register operating devices comprising a control member for a certain numerical order of the values represented by said measuring apparatus and a control member for a lower numerical order geared to said first member so as to move at a higher speed than said first member.

15. In a measuring apparatus comprising a stationary part and a part movable with respect thereto in accordance with the measurements; means for registering the relative position of said parts, comprising register operating devices corresponding to the graduations of said measuring apparatus and movable independently from said movable part; means for selectively operating said register operating devices comprising a plurality of rotary members geared together to rotate at different speeds, said register operating devices being arranged in groups corresponding to the orders of values represented by said measuring apparatus, the selecting means for a group of said register operating devices corresponding to a lower order being controlled by one of said rotary members having a higher speed of rotation.

16. Apparatus as described in claim 9, wherein said selecting means comprises a plurality of rotatable discs bearing contacts and stationary contact bearing members cooperating therewith, said discs being geared together to rotate at different speeds, the contacts of one of said discs rotating at higher speed being connected to a group of said register operating relays corresponding to a lower numerical order of the values of said measuring apparatus.

17. In a measuring apparatus comprising a stationary part and a part movable with respect thereto in accordance with the measurements; means for registering the relative position of said parts, comprising a light-sensitive cell; means for illuminating said cell; a screen rotatable by the movable part of said measuring apparatus and adapted to intercept the light passing from said illuminating means to said cell; a second rotatable screen adapted to intercept the light passing from said illuminating means to said cell, said screens having transparent apertures adapted to come into registration when said screens assume a certain relative position, to transmit the light to said cell; a plurality of register operating relays corresponding to the graduations of said measuring apparatus; an electrical circuit comprising a common part containing a source of electrical current and a master switch, and a plurality of parallel branches each containing one of said relays; selecting devices for selectively connecting said branches to the common part of said circuit comprising two discs bearing contacts and stationary contact bearing members coöperating therewith, one of said discs being fixed to said second screen, the other of said discs being geared to said first disc so as to rotate at a higher speed than said first disc, said second disc having the contacts for the register operating relays corresponding to the lowest numerical order of the values of said measuring apparatus; and a circuit containing said light-sensitive cell and means for operating said master switch.

18. Apparatus as described in claim 9, wherein the common part of said circuit includes a time delay switch adapted to prevent the closing of said circuit until the measuring apparatus has assumed a definitive position.

MAXIMILIAN BÄUML.